Dec. 1, 1925.
H. HECHT ET AL
1,563,626
SOUND SIGNALING DEVICE
Filed Jan. 5, 1921 6 Sheets-Sheet 1
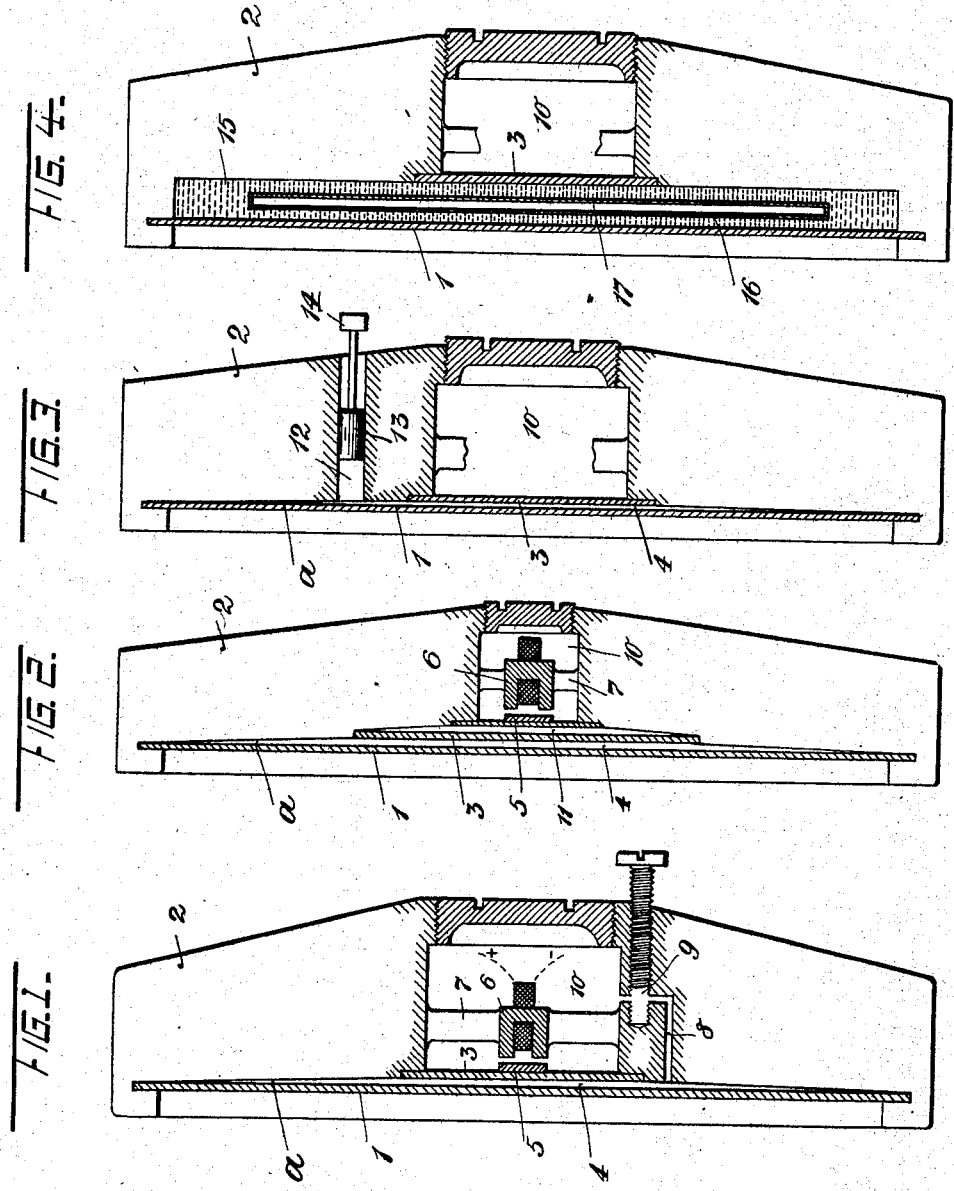

Dec. 1, 1925. 1,563,626

H. HECHT ET AL
SOUND SIGNALING DEVICE
Filed Jan. 5, 1921    6 Sheets-Sheet 2

Inventor:
Heinrich Hecht
Wilhelm Rudolph
Hugo Lichte
Walter Hahnemann by Knight Bros.
attys

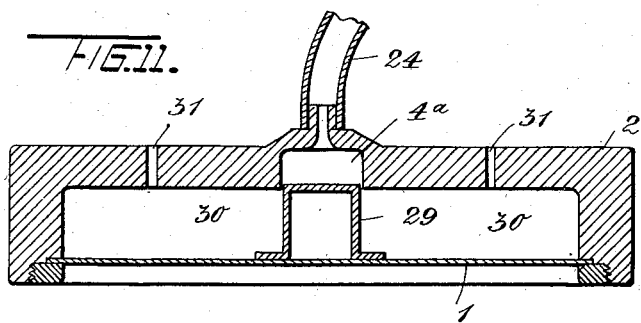
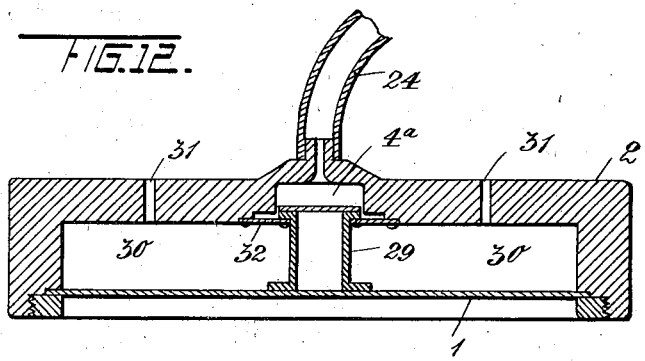
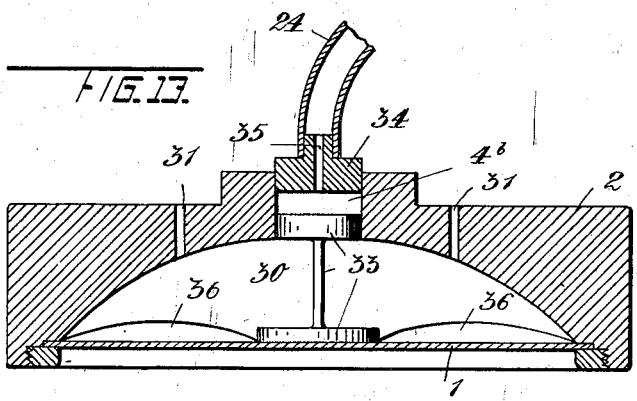
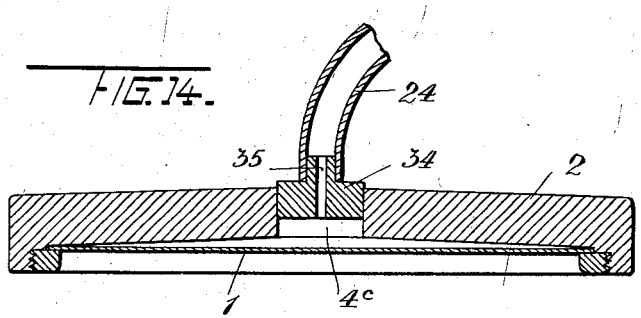

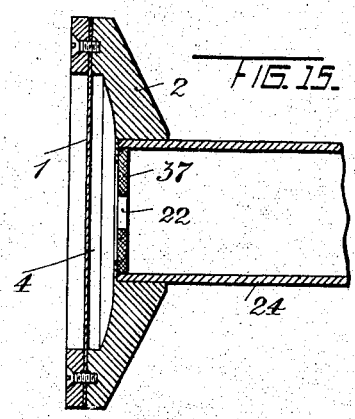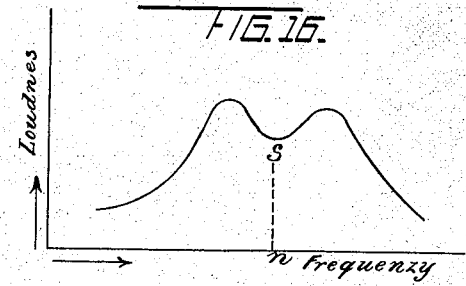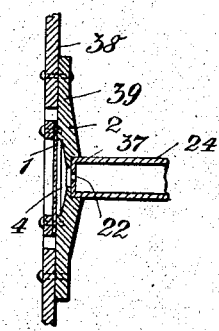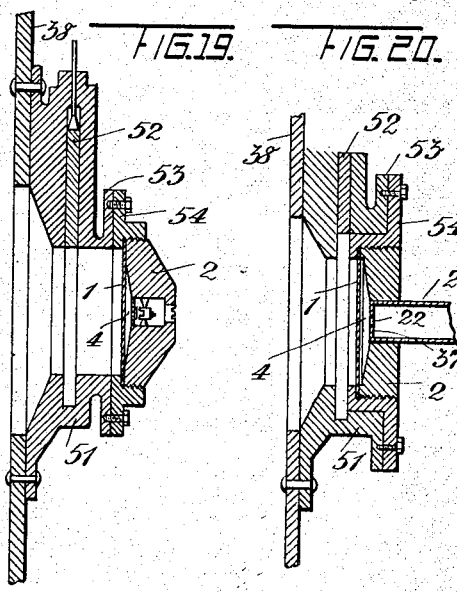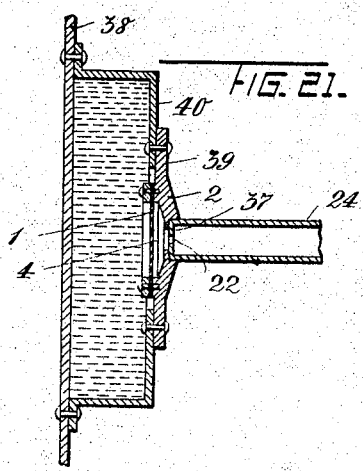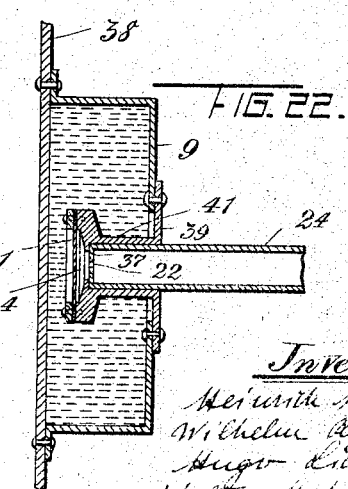

Dec. 1, 1925.

H. HECHT ET AL 1,563,626

SOUND SIGNALING DEVICE

Filed Jan. 5, 1921

Inventors
Heinrich Hecht,
Wilhelm Rudolph,
Hugo Lichte, and
Walter Hahnemann
by Knight Bros.
Attorneys

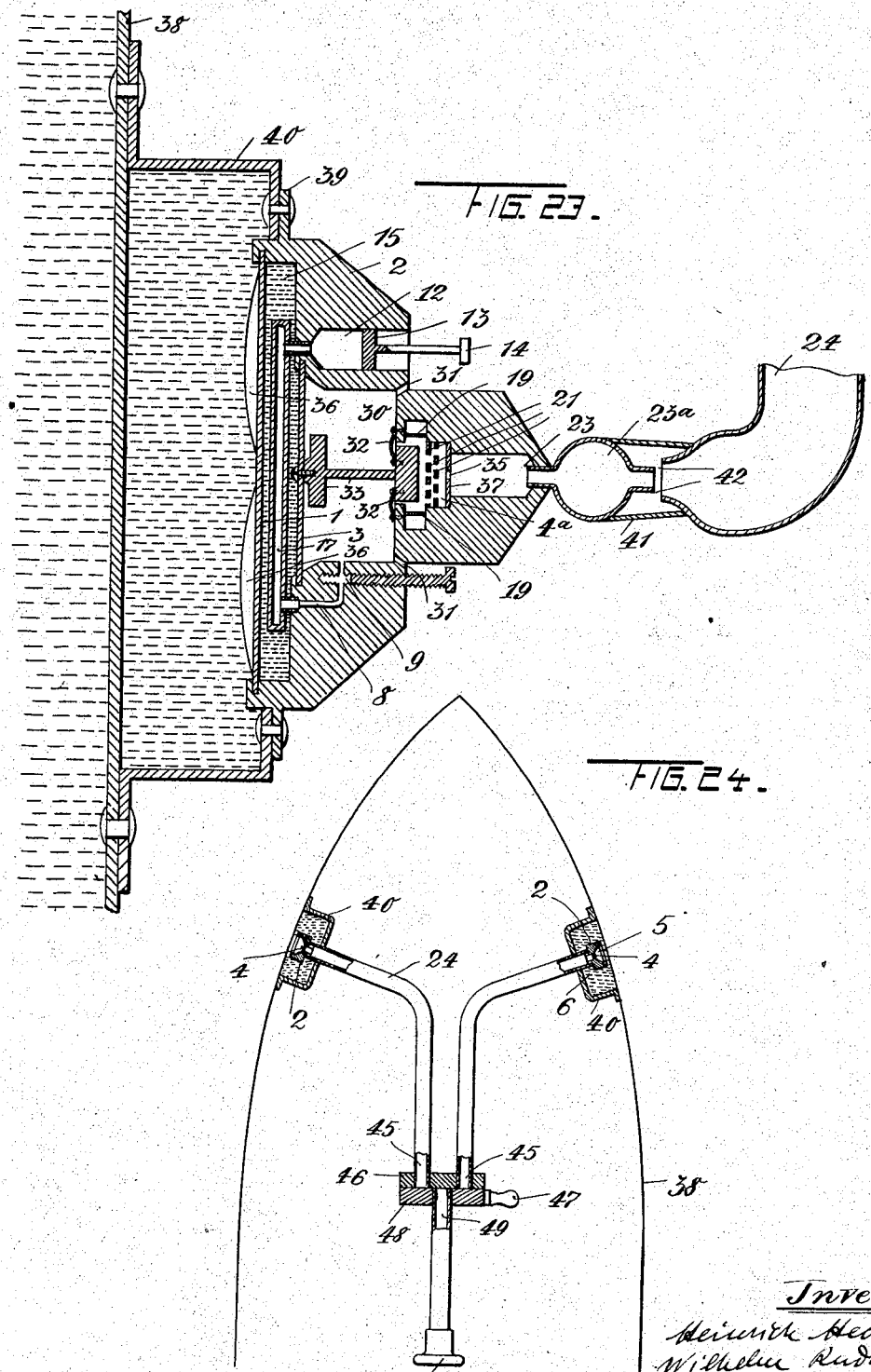

Patented Dec. 1, 1925.

1,563,626

UNITED STATES PATENT OFFICE.

HEINRICH HECHT, WILHELM RUDOLPH, AND HUGO LICHTE, OF KIEL, AND WALTER HAHNEMANN, OF KITZBERG, NEAR KIEL, PRUSSIA, GERMANY, ASSIGNORS TO THE FIRM SIGNAL GESELLSCHAFT M. B. H., OF KIEL, GERMANY.

SOUND-SIGNALING DEVICE.

Application filed January 5, 1921. Serial No. 435,292.

*To all whom it may concern:*

Be it known that we, HEINRICH HECHT, WILHELM RUDOLPH, HUGO LICHTE, and WALTER HAHNEMANN, citizens of the German Republic, and residing at Kiel, at Kiel, at Kiel, and at Kitzberg, near Kiel, county of Schleswig-Holstein, State of Prussia, have invented certain new and useful Improvements in Sound-Signaling Devices (for which we have filed applications in Germany on March 10th, 1917, October 6th, 1917, November 5th, 1917, November 14th, 1917, January 6th, 1919, July 31st 1919, August 6th, 1919, and August 20th, 1919; in Denmark on September 25th, 1919; in Norway on October 10th, 1919; in Sweden on October 16th, 1919; in Holland on November 29th, 1919; in Belgium on July 8th, 1920; in France on July 8th, 1920; in Italy on July 9th, 1920; in England on July 9th, 1920 and July 10th, 1920; in Spain on July 10th, 1920, No. 74648; and in Japan on July 10th, 1920), of which the following is a specification.

The present invention relates to signaling devices for sending or receiving sound signals through water; and in which the sound vibrations are transferred from a surface abutting against the sound propagating liquid or medium to the receiving device proper, or to the said surface from a sound-producing or sending device, by means of a sound transferring or coupling chamber filled with a highly compressible medium such as a gas.

When receiving signals from the outer water the surface abutting against the water does not absorb or pass on all of the sound vibrations impinging upon it but reflects or radiates back a certain amount of the sound. Hence this surface will be termed "the radiating surface or member" both when signals are received by it and when they are sent out from it.

The conditions existing here are analogous to those in wireless telegraphy where the aerial structure that is used both for radiating or sending out and for absorbing or receiving electric waves is called an "antenna," "aerial wire," or "air wire."

Apparatus having a sound transferring or coupling chamber arranged between the radiating member and the sound receiver or producer proper are known, but they have so far not been of a kind that enables results of a practical value to be obtained. The reason of this is the following:—The amount of sound energy transferred by the radiating surface either from or to the water is defined by the extent to which that portion of the sound propagating medium that is located next to the radiating surface, and whose parts oscillate in phase with each other, is alternately compressed and expanded, and by the magnitude of the fluctuations of pressure that then occur. A simple consideration shows that the size of this portion of equal phase depends upon the wavelength of the sound propagated. It decreases as the third power of the frequency of vibration for a given sound propagating medium; and a definite ratio between the fluctuations of pressure and the change of volume of the portion of equal phase will exist for a given radiating surface. If the natural periodic time of the radiating surface is not made to conform to the frequency employed it will, when receiving, oscillate to an extent that corresponds to the change of volume of the sound-propagating medium. If on the other hand the radiating surface is attuned to the frequency of the sound received it will execute oscillations of a more or less increased amplitude according to the extent to which it is damped. Since the magnitude of the damping effect to which the radiating surface is subjected must always remain within certain limits, the amplitude of the motion executed by this surface is always comparable to that of the sound propagating medium, even if the damping effect is small.

In the design of sound signaling apparatus heretofore it will be found that the above considerations have played no part. The coupling chambers that contain the sound transferring medium in these apparatus and that form the sound transferring member between the radiating surface and the actual receiving or sound producing device are always of a size which, in the light of the above remarks, will be found to be much too large to obtain an efficient sound transmission even if, in accordance with proposals that have also already been made, the enclosed gas is kept under pressure, because, on account of the large size of the sound transferring chambers proposed, this pressure would have to be far too high for practical purposes.

The object of the present invention is to provide sound signaling apparatus of the kind mentioned, but of a higher efficiency than those heretofore produced.

This is accomplished by making the sound transferring chamber that contains a compressible sound conducting medium very small and shallow so as to convert it into an efficacious coupling chamber. The term "very small" means in this case that for a radiating member of average size the volume of the chamber shall amount to about only one or not much more than one cubic centimeter, such a volume being suitable for instance in a case where sound vibrations are to be transferred from water to the diaphragm of a microphonic transmitter through a radiating surface and a chamber containing the compressible sound conducting medium, and where the coupling between the radiating surface and the microphonic transmitter is to be tight or close.

With reference to the size of the coupling chamber it may be assumed, as a rule, that the ratio between its volume and the volume of the sound propagating fluid mass abutting against the radiating surface and oscillating in phase in all its parts must be so that the same, or nearly the same, fluctuations of pressure may be caused to exist before and behind the radiating diaphragm.

In the case of a circular radiating surface or diaphragm an efficacious coupling chamber will be obtained if its volume is such as to satisfy the equation $$\frac{h}{r} = 0.1$$

in which $h$ denotes the height of the coupling chamber bounded by the radiating surface and $r$ is the radius of the said surface.

If the diaphragm is not circular the above formula can be made to apply by substituting the diaphragm by a circular surface whose area is equal to its own.

Hence the volume of a coupling chamber that does not abut against the radiating diaphragm would be approximately determined by the equation $$\text{Volume} = V = r^2 . 0.1 r = 0.1 r^3$$

If a looser coupling is desired the coupling chamber must be made correspondingly larger, but even then it would not as a rule be advisable to go beyond an amount of a few cubic centimeters. Thus a means is furnished for adjusting the tightness of the coupling.

Another very simple means for regulating the efficiency of the coupling agency, which the provision of a coupling chamber dimensioned in accordance with the invention will render more successful, consists in applying more or less pressure to the enclosed gas. If this is done the coupling chamber must necessarily be entirely closed in order to maintain the static pressure. But to enable the pressure waves of the sound to pass through the chamber to the other parts of the sound signaling apparatus, such as a sound conductor which conducts the sound to an operator's station, it is preferably closed to these parts by a diaphragm that is adapted for executing suitable vibrations.

The smallness of the coupling chamber greatly increases the effect of the pressure which need only be small, or changed in a small degree, in order to produce an appreciable tightening of the coupling or vice versa.

Hence if a higher pressure is applied in the coupling chamber a coupling can be obtained with a somewhat larger chamber that is just as good as the coupling produced at a low pressure with a very small chamber. From this the general rule may be deduced that during operation the quantity of the enclosed gas per unit of space must always be such that a close coupling is obtained between the radiating member or diaphragm and the parts of the sound signaling apparatus to which the sound is to be transferred, i. e. the actual sound producer or receiver or the sound conductors leading to the producer or receiver.

The understanding of the invention is lightened by the following explanation: As said in the foregoing paragraphs two spaces at the two faces of the radiating diaphragm are of interest, one of them before the diaphragm being filled with water and having an extent of a radius of about half a wave length of the propagated frequency, the other behind the diaphragm being filled with air and inserted between the diaphragm and the sound leading devices. When sound strikes the diaphragm the waterfilled space contains a definite amount of sound energy in the form of oscillations of the molecular parts of water, the variations of pressure at the face of the diaphragm being comparatively great in comparison with the extent of these oscillations. For transferring the same amount of energy into a normal air filled chamber it would be necessary to change both components of energy i. e. to enhance the amplitudes of motion and to diminish the amplitudes of pressure, because the compressibility of air is very much greater than that of water.

As stated in the earlier paragraphs of this application the motions of the radiating diaphragm are limited by the extent of the motions of the water. Thus the volume of an air filled chamber according to the present invention is varied by the definite oscillations of the diaphragm within a definite rate, and the smaller the air volume in such a chamber is made the greater the pressure variations grow. In this way it is possible to obtain substantially equal pressure variations in both the spaces before and behind the radiating diaphragm. We can say that in this case both media, the water and the air, show practically the same hardness against the sound oscillations, the former in consequence of its little compressibility, the latter in consequence of the smallness of its volume with relation to the portion of the radiating member acting thereon or acted upon.

In accordance with this explanation the invention can precisely be defined by saying: For transferring a sufficient amount of sound energy from the water to the sound leading devices the volume of air in the chamber behind the diaphragm must have such a size that the variations of pressure of this air become equal or about equal to the pressure variations in the water space before the diaphragm, or in other words, both "spaces must have the same sound hardness".

The actual receiving or sound producing devices themselves may in all cases be combined with special tuning structures, or they may themselves represent such structures, or they may be made so as not to execute any natural vibrations. Similarly the radiating surface may be made to form a part of a tuning structure, or it may itself represent an attuned structure, or be made so as not to execute any natural vibrations.

The entire apparatus may comprise two diaphragms, one of which represents the radiating surface abutting against the sound conducting liquid, whilst the other as associated with the receiving or sound producing device proper; and the elastic forces of these two diaphragms, and if desirable these forces together with those of neighbouring masses of liquid and gas, may be regulated with respect to each other in such a manner that the aggregate vibrating parts have only one predominant natural period of vibration, or the attuning of the parts may be such that the said aggregation of parts have two or more frequencies on account of two or more parts of different natural rates of vibration being coupled to each other.

Another feature of the invention consists in an arrangement of the coupling chamber by which the efficacy of the coupling is less at frequencies that are higher or lower than the chosen operating frequency, so that, if it is assumed that the apparatus under consideration is a receiver, only the sound vibrations lying within a certain range of frequencies will be received, this result being obtained in the first place merely through the arrangement of the chamber itself without any additional aid by a tuning of the members of the apparatus. This is accomplished in the following manner:

It has been explained above that, assuming the couplings to be the same, the volume of the water near the radiating surface, whose parts vibrate in phase with each other, i. e. the volume which is to be taken into account in determining the volume of the coupling chamber, decreases as the third power of the wave length.

Hence if the proportions of the coupling chamber have been determined for a certain coupling effect at a frequency of, say, 2000 oscillations per second, the coupling chamber will be too large for higher frequencies, i. e. for smaller wave lengths, and every increase of the periodicity will be automatically accompanied by a corresponding loosening of the coupling. If it is desired to cause the tightness of the coupling to also fall off when the frequency is lowered, this may be accomplished by connecting the coupling chamber through a passage that exerts a certain throttling effect on the gas to a second larger chamber filled with air or some other elastic medium, and by causing the throttling action to be such that it is very effective at the chosen periodicity of say 2000, but falls off rapidly when the periodicity decreases. The result of this arrangement is that, as far as the lower frequencies are concerned, the volume that determines the coupling effect is the volume of the coupling chamber added to that of the second chamber, and if these chambers are properly dimensioned, the lower the frequency is, the looser the coupling will be. It follows from the above that with any given coupling chamber the tightness or closeness of the coupling effected by it decreases in any case when the frequency increases, and a similar decrease of the coupling effect may be obtained by connecting the coupling chamber proper through a sufficiently narrow passage or through a suitable throttling device to the aforesaid second chamber. By this means the receiving apparatus may be adjusted to only receive sounds whose frequencies of vibration lie within a certain desired range. In accordance with the invention the adjustments that may thus be effected by changing the size of the coupling chamber, or alternating the efficiency of the throttling device situated between the coupling chamber and the second auxiliary chamber, may be executed in loco or with the aid of distant control devices.

An important feature of the invention consists in the means it affords for regulating within wide limits the ratio of transformation between the amplitudes of the oscillations that take place at the radiating surface and the corresponding amplitudes at the sound producing device or receiving device proper. All that is necessary to accomplish this is to establish a proper relationship between the size of the radiating surface and of the surface or diaphragm adjacent to the sound producing or receiving member or of the opening by which the coupling chamber communicates with the sound conducting members.

When the coupling chamber employed is very small, as for example in cases in which sounds of a very high frequency of vibration are to be translated with a high ratio of transformation, the amount of friction produced between the gas set in motion by the sound radiator and the walls of the chamber is considerable, especially in chambers of a conical shape because, on account of the high compressibility of the medium with which the chamber is filled, the particles of the medium execute in addition to the desired axial movements also very large transverse movements. A preferred means for reducing this friction consists in filling the chamber with a combined charge comprising a practically incompressible medium (liquids) and a highly compressible medium (gases), the latter being placed in a special vessel of such a form that as large a surface as possible is presented to the incompressible medium and that the particles of the highly compressible medium execute oscillations in a direction that is in general vertical to the said surface.

Another improved means of reducing the said friction that may be employed either in apparatus charged entirely with a compressible medium, or in such as are charged with a combination of compressible and incompressible media, consists in establishing the coupling by means of gases that produce little internal friction, as for example hydrogen, ammoniac or the like. This expedient offers the advantage that it renders it possible to operate with the smallest possible damping (smallest loss) at the outset. If it then turns out that a greater damping effect is required (say for the purpose of broadening the crest of the resonance curve) this can be done by first increasing the useful damping, as by extracting energy by a detector in receiving signals, and by then introducing any desired amount of damping that might still be wanting to bring the total damping effect up to the desired figure. This procedure may be adopted for example whenever in apparatus serving for the transmission of signals the tuning becomes too sharp for reliable operation, or when in apparatus intended for the detection of noises a disturbing distortion of these noises occurs through the natural vibrations that are set up in the apparatus itself being insufficiently damped.

In accordance with the invention the damping of apparatus may be increased when desired by increasing the useful damping by providing special damping means in the coupling chamber or at its confines, which absorb a part of the energy of vibration in the said chamber. In addition to a number of known damping means the following means may be advantageously employed. The walls of the coupling chamber may be entirely or partly made of yielding substances in which a large amount of internal friction is produced. In cases where the construction of the apparatus is such as to render the use of such walls impossible they may be entirely or partly lined with the said substances. Other kinds of damping means that may be employed are grids, netting or porous partitions inserted in the coupling chamber in such a manner as to exert a throttling effect on the enclosed medium that is set in motion by the radiator.

The application of damping means aforesaid is of course not limited to apparatus in which the coupling chamber is closed to the passages leading away from the chamber to other internal portions of the apparatus, for this means may be advantageously employed in all manner of apparatus, no matter how the energy is caused to pass from the internal parts of the apparatus into the coupling chamber, or out of this chamber into the said internal parts.

Other important features of the invention, which, in addition to those mentioned above, appear in the appended claims, will be more readily understood when described by reference to the accompanying drawings in which various embodiments of the invention are illustrated.

Figs. 1 to 3 are sectional representations of sound signaling apparatus with shallow, conical coupling chambers; the apparatus of Fig. 1 having its coupling chamber connected to a large auxiliary chamber by a channel containing a throttling member, the apparatus of Fig. 2 being provided with a supplementary or third diaphragm, and the apparatus shewn in Fig. 3 being provided with a device that enables the coupling to be changed whilst the apparatus is in operation.

Fig. 4 illustrates a section of an apparatus in which the coupling chamber is charged partly with gas and partly with a liquid.

Figs. 5 to 7 illustrate sections of sound signaling apparatus having special damping means arranged in their coupling chambers; this means consisting in Fig. 5 of a wall of yielding substance placed between the coupling chamber and an annular cavity, in Fig. 6 of a special lining on the interior wall of the coupling chamber, and in Fig. 7 of perforated or pervious partitions arranged in the coupling chamber.

Figs. 8 to 10 show sections of apparatus in which the coupling chamber is in communication with a second gas chamber through a narrow opening; the second gas chamber consisting in Fig. 8 of a sound conducting tube leading to a sound producing device, in Fig. 9 of a space that acts as a mouth piece in a diver's helmet and in Fig. 10 of a space in which an electrical sound detector is placed which converts the sound energy into electrical current fluctuations.

Figs. 11 to 13 are sections of apparatus in which the radiating member and the coupling chamber consist of independent parts that are operatively connected by an intermediate member; this member consisting in Fig. 11 of a piston whose one end enters the coupling chamber and whose other end is attached to the center of the radiating member, in Fig. 12 of a piston arranged similarly to that of Fig. 11 except that the end adjacent to the coupling chamber is attached by a soft annular diaphragm to the rear wall of the casing, and in Fig. 13 of an oscillatory structure made up of two vibrating masses connected to each other by an elastic rod.

Fig. 14 is a section through an apparatus in which the essential part of the coupling chamber is a cylindrical space opposite to the central portion of the oscillating diaphragm or radiating member, the other part of the coupling chamber being so flat that it does not come into account.

Fig. 15 represents a section through a sound signaling box of an apparatus of capsular form in which the coupling chamber is attuned so that its acoustic properties stand in a certain relation to those of the diaphragm, preferably so, that the diaphragm and the coupling chamber have the same pitch.

Fig. 16 shows the resonance curve of the apparatus of Fig. 15.

Figs. 18 to 20 illustrate various ways of mounting sound boxes in accordance with the invention; the manner illustrated in Fig. 18 consisting in fixing the sound box in an aperture in the wall of a ship or buoy, in Fig. 19 in providing a valve through which the water is shut out from or admitted to the sound box, and in Fig. 20 of a modification of the arrangement of Fig. 19.

Figure 5:
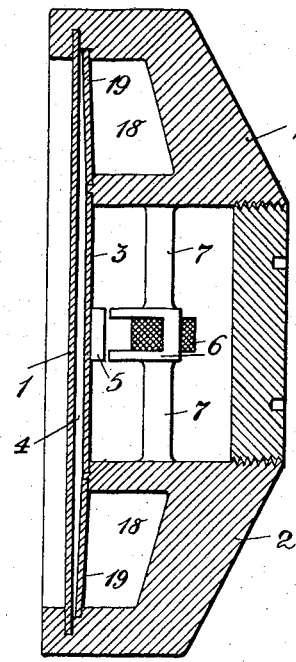

Fig. 21 shews the apparatus of Fig. 18 mounted on the rear wall of a water-box attached to the interior of a ship's hull, and Fig. 22 illustrates a similar arrangement except that the sound box projects a certain distance into the water-box.

Fig. 23 is a section of an apparatus in which most of the important features of the invention are combined.

Fig. 24 is a plan view of the bow of a ship having sound signaling apparatus as shewn in Fig. 23 arranged in water boxes attached to opposite sides of the hull.

Fig. 1 represents an electromagnetic device that may be used either as a sound producer or a receiver and which is designed for operation under water. For convenience of description it will be assumed that the device is a receiver, although it could also be used as a sender without any fundamental alteration. 1 is the radiating surface that abuts against the outer water and is made in the form of a diaphragm. This diaphragm 1 closes the interior cavities of the disk-shaped casing against the outer water, the submerged casing being made water tight on all sides. The chambers inside the casing are filled with air. 3 is a secondary diaphragm that is arranged opposite the primary diaphragm 1. A flat coupling chamber 4 of very small volume with respect to the area of the radiating surface acting thereon or acted upon and filled with air is arranged between the two diaphragms, the volume of the chamber being made smaller the tighter the acoustic coupling between the diaphragms is to be. Fixed to the diaphragm 3 is a small armature 5 placed opposite to the electromagnet 6 which is attached to a small cross-beam 7 that is in turn fixed to the inner walls of the vessel or casing 2. The chamber 4 is connected with the larger part of the inner cavity 10 by a channel 8 in which there is provided a throttling member 9. If a tone of a frequency of, say 2000 vibrations per second, is to be received from the water it will be necessary, if the coupling is to be a fairly tight or close one, and if the air in the coupling chamber is kept at a normal pressure of one atmosphere, to make the size of the chamber 4 less than one cubic centimeter. Hence the distance between the two diaphragms will, if their diameters measure say a few centimeters, not amount to more than a few tenths of a millimeter. If the coupling is to be such that only a part of the pressure fluctuations of the coupling medium are communicated to the diaphragm 3 this can be achieved either by a corresponding enlargement of the coupling chamber or, in the case of an air charge kept under pressure, by a corresponding reduction of the pressure applied, or by connecting the coupling chamber 4 with the chamber 10 that is several times larger than the chamber 4. If the last means is adopted the connecting passage must be made to exert the throttling effect required to obtain the desired tightness of coupling by the chamber 4. It has already been pointed out in the preceding statements that this throttling means has the advantage that its efficacy diminishes as the frequency drops, so that the apparatus becomes less sensitive with decreasing frequencies. The explanation for this is that if the diaphragm 1 oscillates relatively slowly and thus gives rise to slow fluctuations of pressure in the chamber 4 a comparatively large quantity of air will have time to stream through the passage 8 into the large chamber 10 and the air that thus escapes from chamber 4 will not be available for bulging in the diaphragm 3. The larger the quantity of air is that is given time to escape from the chamber 4 the smaller the effect of the air on the diaphragm 3, i. e. the smaller the coupling effect will be.

Another advantage offered by the communicating passage between the chamber 4 and the space 10 is that it causes the diaphragm 3 to be relieved of the constant static pressure that would bear against it when the apparatus is submerged. When the apparatus is subjected to the pressure existing at a considerable depth the diaphragm 1 is more or less bulged in. This would give rise to an excess of pressure in the chamber 4 which would be particularly large on account of the extreme smallness of the chamber and which would cause the diaphragm 3 with the armature 5 to be bulged in. This would mean a change of the distance between the armature 5 and its electromagnet 6 and an undesirable alteration of the sensitiveness of the apparatus. The advantage obtained by connecting the chambers 4 and 10 by the channel 8 is that alterations of the static pressure do not cause the diaphragm 3 to be moved towards the cross beam 7.

In place of the electromagnet 5, 6 other forms of receiving devices such as a microphone that responds to pressure fluctuations or to a shaking action, or a tuned structure containing the receiving device as shown in the U. S. Patent 1,133,635 could be provided. If a microphone that responds to pressure fluctuations were employed the above described changes of distance would be deleterious.

Of course the diaphragm 3 may be relieved of static pressure in a known manner by arranging a third chamber and diaphragm in front of the others. The various members of the structures may also be attuned and dimensioned with respect to each other in a known manner and in such a way that the desired damping effect is produced. By selecting an adequate ratio between the sizes of the diaphragms 1 and 3 a transformation of the amplitudes of the oscillations executed by these diaphragms may be obtained in a known manner. By this means the amplitudes at the diaphragm 3 may be made larger or smaller than those of the diaphragm 1 as desired. When the apparatus is to be used under water the diaphragm 3 is generally made smaller than the diaphragm 1 as shown in the drawing.

If the diaphragm 1 is attuned to the tone that is to be received, and if the diaphragm 3 is arranged so as not to execute any appreciable oscillations that are due to its own natural period of vibration, a simple, single-tone structure will be obtained in which the magnitude of the damping effect due to the radiation of sound energy (radiation damping) is determined at the chosen frequency by the size of the diaphragm 1, and in which the useful damping effect—i. e. the amount of damping that produces a useful effect—at a given size of the diaphragm 3 and with a given electromagnet 5, 6 is determined by the coupling action of the chamber 4 and ratio of transformation existing between the surfaces 1 and 3. By enlarging the chamber 4 the useful damping effect is decreased, and by reducing the size of the chamber 4 the useful damping effect is increased. This affords a convenient means of balancing the useful and radiation damping effects. If the member 3 is also attuned there will be two tuned structures of which, in addition to their inner injurious damping effects, the one embodies the radiation damping effect and the other the useful damping effect. By properly dimensioning the coupling chamber 4 in the manner described above the two vibratory members may then be coupled looser or tighter to each other and a balancing of their damping and tuning effects thus obtained.

Instead of attaching the receiving member proper to the diaphragm 3 another coupling chamber filled with an elastic coupling medium and arranged in accordance with the invention may be interposed between the diaphragm 3 and the said actual receiving member as shewn in Fig. 2. The various members are then arranged in the following order:

The radiating or sound collecting diaphragm 1 is coupled by means of the coupling chamber 4 to the diaphragm 3.

The diaphragm 3 is in turn coupled by means of the coupling chamber 11 to the receiving device proper 5, 6.

If 1 and 3 were attuned to the tone to be received but not the receiving device 5, 6 it would be possible to change the useful damping of the member 3 by means of the second coupling chamber and the first coupling chamber would enable the closeness of the coupling between the radiating member and member 3 that embodies the useful damping to be altered. Many kinds of such groups of chambers or diaphrams may be employed and a number of individual groups may be arranged one behind the other.

Instead of flat diaphragms surfaces of any other shape may be used, and in place of an electromagnetic receiver a microphonic receiver actuated by pressure or a shaking action, or any other kind of receiver may be employed. The actual receiving device itself may also be attuned to the particular note of the sound to be received.

In Fig. 3 a device is shewn that enables the tightness of the coupling to be altered whilst the apparatus is in operation. This device consists of a piston 13 which, by means of a handle 14 projecting from the casing 2, can be shifted in the chamber 12 that is connected to the coupling chamber 4. The tightness of the coupling may be altered through shifting the piston 13 from a distance by means of electromagnetically actuated distant control devices, or any other suitable kind of device. The tightness of the acoustic coupling could of course also be changed from a distance by altering the pressure of the air in chamber 4.

The coupling established by the chamber 4 may be altered during the operation of the apparatus in the manner described above or in some other suitable way. If the apparatus is of a kind in which the coupling chamber effects a coupling between two structures (diaphragms) which are attuned to execute maximum oscillations at two different frequencies of sound vibration, the tuning of these structures may be varied by changing the tightness of the coupling. If the apparatus is such that its aggregate structure is attuned so as to execute its maximum oscillations at one certain frequency only the variability of the coupling effect will enable relative variations of the damping effects, viz, the radiation damping and useful damping effects, to be carried out.

In Fig. 4 a sound signaling apparatus is shewn having a coupling chamber, provided with a coupling medium consisting of a combination of gas and liquid. The space between diaphragms 1 and 3 is filled chiefly with a liquid 15 in which a flat or shallow vessel 16 is immersed having flexible walls and whose interior 17 is charged with a highly compressible medium or gas. The liquid only serves to transfer the motion of diaphragm 1 to the diaphragm 3 and is not compressed to any appreciable extent, whereas the space 17 in the vessel 16 that is filled with gas acts as an acoustic coupling between the two diaphragms 1 and 3. Where a coupling chamber contains both a highly compressible and a substantially incompressible medium, as in this modification of the invention, the combined effect is as that of a compressible medium. A similar effect could of course be obtained by arranging the gas chamber immediately behind the diaphragm 1, and by disposing the liquid chamber behind the gas chamber.

Figure 6:
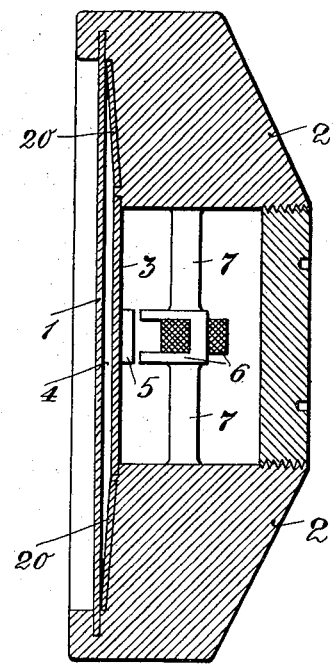
Figure 7:
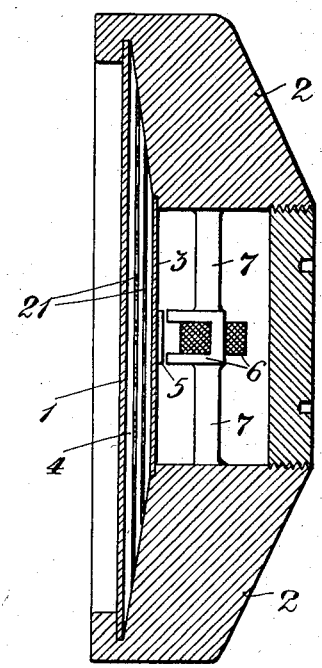

Figures 5 to 7 will also be described as if these figures merely represented a submerged electromagnetic receiver. But it must be borne in mind that without any essential alteration the description might be taken to refer just as well to a sound producer. The coupling chamber in itself is constructed in principle similarly to those in Figs. 1 to 3 and similar parts are designated by similar signs of reference.

In the interior of the casing 2 of the apparatus shewn in Fig. 5 an annular cavity 18 is provided which is closed to the coupling chamber 4 by a wall 19 consisting of a yielding substance that serves to increase the damping effect for the purpose mentioned in the preceding description.

Fig. 6 illustrates a modification of the apparatus of Fig. 5 in which the wall of the casing 2 that envelops the chamber 4 is coated with a lining 20 consisting of substances which produce a large amount of friction in their interior.

In the modification shewn in Fig. 7 perforated or sieve-like partitions 21 that operate to increase the damping effect are interposed in the coupling chamber 4 between the diaphragms 1 and 3. The significance of the other parts will appear from their signs of reference.

In apparatus in which the coupling chamber has a diaphragm 3 abutting against it which is in turn attached to the sound exciting or detecting member 5, 6 the employment of such members or, in the case of a sound producer, of a special exciting member immediately at the boundary of the air coupling chamber may lead to complications in the construction of this kind of apparatus apart from the general difficulties connected with the use of special detecting devices, particularly with microphones. When two diaphragms, one of which is the radiating member whilst the other is the support that holds the receiving or exciting device proper, are placed so near to each other as the purposes of the invention require, detrimental acoustic qualities of the apparatus may also arise through the occurrence of unstable and complicated coupling conditions of the two diaphragms.

In accordance with the invention these difficulties are entirely or partly avoided by arrangements which cause the coupling chamber to affect a second sound conducting chamber, this latter chamber being connected with the former by an opening which is of such size that the coupling effect and at the same time an efficient sound transmission is maintained. In certain instances this opening may be closed with a yielding diaphragm or plate.

The second sound conducting chamber just mentioned differs fundamentally from the chamber hereinbefore described that is employed for the purpose of effecting the closeness of the coupling. The second sound conducting chamber merely serves as an efficient means for conducting, or passing on, the sound waves imparted to the body of gas therein.

In the simplest form of this arrangement the second chamber may, in the case of a receiving apparatus, consist of a pipe leading straight to the ears of the operator. The use of a second diaphragm and a special detecting device is then avoided altogether. The arrangement may be such that the said second chamber is in the form of a resonator. A combination of these arrangements may also be used in which a resonator is interposed between the coupling chamber and the pipe, or between the pipe and the ear.

The contrivances mentioned in the last paragraph are intended for the reception of sound signals by the ear. But if altered accordingly they may also be used for sending out signals. This may be done by connecting an air wave sound producer, which may be of any known type, to the gas chamber which adjoins the coupling chamber. The connection may be such that the sound producer is placed in the position which, if the apparatus were used for receiving, would be occupied by the ear, and that the sound vibrations emanating from the sound producer are conducted to the gas or air chamber and from thence through the coupling chamber to the radiating member. The sound producer may of course just as well be connected to the air chamber by a special pipe, or it may be partly or entirely built into the said air chamber. Special advantages accrue from such arrangement in cases where the apparatus is used for signaling under water because it enables sound producers of a simpler and cheaper type to be used and renders it possible to transfer the sound energy produced by the sound producers to the outside medium through which the sound is propagated in an extremely simple form and yet at a high efficiency. The sound producers employed might of course be the organs of speech so that this arrangement also enable spoken words to be transmitted under water between ships, buoys, diving apparatus, etc.

Figure 8:
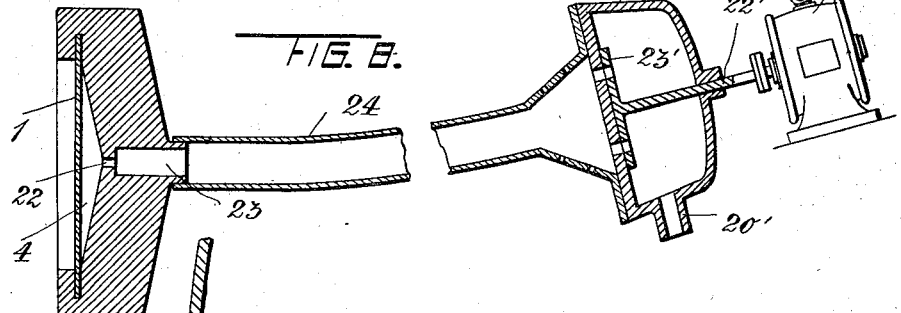

An apparatus of the kind described in the preceding paragraph is shewn for example in Fig. 8 in which the coupling chamber 4 is connected by an opening or passage 22, that is so narrow as not to impair the coupling effect, a second air chamber 23 that is cylindrical in form and to which a sound conducting tube 24 is joined that leads to a sender in the shape of a disk siren, whose disk 23' is rotated through a shaft 22' by a motor 21' and the interior of which is supplied through a lateral pipe 20' with an operating medium under pressure. The end of the pipe next to the siren is widened in the shape of a cone whose walls are perforated to allow the operating medium to escape. The size of these perforations is such that the sound waves are not diverted through them.

Figure 9:
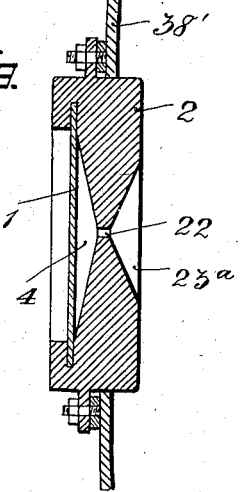

Fig. 9 illustrates a device shaped somewhat different from that shown in Fig. 8 but constructed in accordance with the same principles. The second gas chamber 23$^a$ is widened out so as to form a speaking trumpet or mouth-piece and the apparatus 2 may be assumed to be fixed in a suitable spot of a diver's helmet, a fragment of whose wall 38' is shown. Such apparatus are preferably arranged at the two sides of the diver's helmet at the parts next to the ears, and at the front of the helmet opposite to the diver's mouth. To facilitate hearing, special sound conducting tubes may be provided that lead from the chamber 23$^a$ to the auditory ducts of the diver. In this case the chamber 23$^a$ may be shaped as a resonating chamber.

Figure 10:
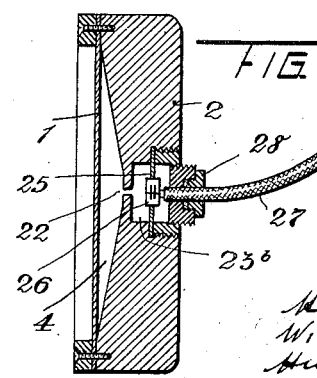

Just as special sound producing devices may take the place of the organs of speech in the examples just described, the place of the ear in a receiving apparatus may be taken by any suitable form of receiving device. This fact gains in importance in cases where sound waves are to be received which arrive in a medium that is not readily accessible to the ear of the listener and the perception of which is to be carried out in a place to which it may seem objectionable to lay sound conducting pipes. In cases like this the sound conductor formed by the air chambers or ducts may be interrupted at any desired spot. They may for example be cut short in the gas chamber itself that adjoins the coupling chamber and a detecting device (such as a microphone, electromagnet, etc., capable of converting the sound vibrations into electrical waves may be arranged in the gas chamber. For conducting the energy thus converted to a place situated beyond the gas chamber and for rendering it perceptible a known means may be employed. A sound signaling apparatus in which an energy converting means is arranged in a gas chamber adjoining the coupling chamber shewn in Fig. 10. The paths through which the sound waves are propagated which include the outside medium, the diaphragm 1, the coupling chamber 4 and the gas chamber 23$^b$, are interrupted at this latter chamber where a detecting device in the shape of a microphone 26 that converts the sound waves into electric waves is arranged in a ring-shaped diaphragm 25 extending across the gas chamber. The electric waves are conducted from the microphone by an insulated electrical conductor 27 led into the gas chamber through a watertight stuffing box or gland 28.

If the second gas chamber behind the coupling chamber is made in the form of a chamber of any general type a mono-resonant apparatus will result, i. e. an apparatus that, as a rule, will possess only one predominant natural rate of vibration, which will be determined partly by the elastic properties of the radiating member and of the abutting coupling chamber, and partly by the mass of the radiating member and of the medium at either side of the radiating member. A system that is on the whole mono-resonant will also be obtained if the elastic force of, say, the radiating member is made very small and the gas chamber adjacent to the coupling chamber is made to act as a resonator tuned to some particular note. By tuning this gas chamber and the radiating member with respect to each other more or less accurately, and by varying the closeness of the coupling between the said gas chamber and radiating member, the vibrating system can be made to possess two natural rates of vibration which are more or less near to each other and whose damping, when they are tuned with respect to each other, is determined by the sum of the dampings of the two individual vibratory elements. By coupling together more than two individual vibratory elements of the kind described it is possible to construct senders or receivers having more than two natural rates of vibration or frequencies of resonance.

In the apparatus hereinbefore described the area of the radiating member or diaphragm that closes the coupling chamber against the sound propagating medium is preferably made relatively large with respect to the area of the diaphragm that is attached to the detecting or exciting device, or that closes the narrow connecting passage that leads to the second gas chamber or duct, in order to obtain oscillations of large amplitude at the sound receiving or sending device proper. A similar relation exists between the area of the radiating member and that of the connecting passage between the coupling chamber and the sound conducting chamber or conduit, when the latter form of the invention is employed. It is generally necessary, if a sufficiently tight coupling is to be effected with a cone-shaped coupling chamber, to make the coupling chamber extremely flat or shallow so that it tapers down very abruptly towards the smaller vibratory body or diaphragm. This results in the gas contained in the coupling chamber being impelled or oscillated not only in the desired axial direction, i. e. in a direction perpendicular to the radiating diaphragm, but also in a large measure in a tangential or lateral direction. This latter motion, which, as has already been stated, is by no means always desired, might under certain circumstances even outweigh the former motion so that the acoustic process becomes extremely complicated and difficult to estimate. Since these undesirable effects are enhanced by the said tangential motions taking place between surfaces situated extremely close together the damping produced by friction due to these motions is frequently so considerable that it is bound to cause grave losses of energy, and this very often just in cases where such losses ought to be entirely avoided or where they are at any rate not permissible to the extent to which they are liable to occur under the aforedescribed circumstances.

But it is not always feasible to fill the coupling chamber with a mixed charge or with a gas having small internal friction, as for example in apparatus in which the coupling chamber is in direct communication with the sound conducting chamber, conduit or pipe, and therefore a problem requiring solution is to construct the coupling chamber in such a manner as to avoid the said losses through friction. The solution presented by the invention consists in geometrically separating the coupling chamber from the radiating member and in providing a special intermediate member between the said chamber and the radiating member. In addition to reducing the friction losses this solution removes to a considerable extent the limitations governing the design of the chamber adjacent to the radiating member, for the characteristics of this chamber are then no longer dependent on the size of the radiating member. On the other hand certain limitations on the design of the radiating member having the same origin as those which restricted the coupling chamber are removed. Hence the coupling chamber may now be made deeper than it could be in the types of apparatus heretofore described because it is narrower and in this way has the same minute volume.

In reducing this idea to practice the procedure will generally be to attach a rigid member to the radiating diaphragm that projects out from the diaphragm as far as the coupling chamber and forms a wall that may be moved in and out of the said chamber when the radiating member is oscillated. In shaping the wall or surface of the said rigid projecting member care must be taken to prevent the gas in the chamber from moving transversely to the oscillations of the said member.

This feature of the invention may therefore be realized in various ways. In a preferred design the coupling chamber is connected to the radiating diaphragm by a rigid member which is arranged in the opening of the chamber that faces the said diaphragm in the manner of a piston that closes the said opening. This piston must be of such size that on the one hand there must be a certain amount of clearance between the piston and the wall of the copuling chamber so as to permit the piston to move in unison with the oscillating radiating diaphragm, but on the other hand this clearance must be so small as to prevent the medium in the coupling chamber from escaping therethrough so freely as to hinder the creation of acoustic pressure fluctuations and vibrations in the coupling chamber.

A greater security against this escape of the air than can be obtained with a simple free piston can be achieved by using some special means for sealing the space between the intermediate member or piston and the periphery or wall of the coupling chamber. Thus the piston may be connected to the end surface of the coupling chamber by an annular diaphragm which is soft as far as the motions of the piston are concerned but, which is hard in regard to its acoustic properties, inasmuch as its natural freqency of vibration is high.

Apparatus in which the features described in the last four paragraphs are embodied are shown in Figs. 11 and 12. In the apparatus of Fig. 11 a coupling chamber is provided opposite to the center of the diaphragm 1 in the form of a cylindrical cavity 4ª in the interior wall of the casing. A piston 29 rigidly connected to the radiatig diaphragm 1 fits with little clearance into the coupling chamber 4ª to which a sound conductor 24 is joined. The sound energy taken up by the diaphragm 1 is transferred by the piston 29 to the coupling chamber 4ª. The space 30 in the casing which surrounds the piston 29 is placed in communication with the atmosphere through holes 31 in order to prevent compressions of the air enclosed in the said space.

The modification illustrated in Fig. 12 is essentially similar to the apparatus of Fig. 11 except that the piston 29 is connected to the inner wall of the casing 2 by an annular diaphragm 32 which acts as a seal that completely closes the coupling chamber 4ª against the space 30 and which, whilst being soft and yielding as far as the movements of the piston 29 are concerned, is hard in regard to the oscillations of the air in the coupling chamber.

The connecting member between the coupling chamber and the radiating member, instead of being entirely rigid as in Figs. 11 and 12, may in itself consist of an oscillatory structure which, if desirable, may also be utilized for transforming the amplitudes of the acoustic oscillations. The intermediate or connectig member will be preferably attached to those parts of the radiating member that execute the largest movements when oscillating at the frequency of the sound to be transmitted. This applies particularly to rigid intermediate members, such as for example those shown in Figs. 11 and 12. If it is not absolutely necessary to entirely do away with all the evils residing in flat conical coupling chambers, a sort of combination of a coupling chamber of this kind and of the type just described with reference to the Figs. 11 and 12 may be constructed by making a cavity, which may be cylindrical in shape, in the center of the one wall of the flat conical coupling chamber. In an apparatus of this character the said centrally located cavity is situated directly opposite and very near to the middle of the radiating member so that this member itself acts something like a piston, and a special intermediate member between the radiating member and the coupling chamber is unnecessary.

If a special intermediate member is inserted between the radiating member and the coupling chamber the radiating member will preferably consist of a ribbed, stiffened, or piston-like diaphragm. The object of this is to cause the whole of the energy of vibration residing in the radiating member to be transferred to the coupling chamber and to prevent a zone being formed at the point where the intermediate member is attached to the radiating member which behaves more or less like a nodal point.

Apparatus of the kind referred to in the last two paragraphs are shewn in Figs. 13 and 14.

According to Fig. 13 a special vibratory structure 33 is used as an intermediate member for connecting the coupling chamber 4ᵇ to the diaphragm 1. The vibratory structure 33 consists of two heads or masses connected by an elastic link member, and may or may not be attuned to a certain tone. The coupling chamber 4ᵇ is provided at the end that is farthest from the diaphragm with an adjustable piston-like stopper or seal 34 by which the size of the chamber may be regulated so as to change the degree of coupling. The coupling chamber 4ᵇ is connected through a hole 35 in the piston 34 to a sound conducting tube 24. In order to transfer the greatest possible amount of the energy of vibration that is taken up by the diaphragm to the oscillatory structure the diaphragm is compelled by stiffening ribs 36 (which only permit flexures of the diaphragm near its periphery and in the space near the periphery of the mass connected to it) to oscillate in such a manner that no undesirable nodal lines can be formed.

In the apparatus shewn in Fig. 14 the coupling chamber although it abuts against the entire surface of the diaphragm 1, is made extremely flat opposite to the parts of the diaphragm that only vibrate very little whilst a cylindrical cavity 4ᶜ is provided opposite to the middle diaphragm portion that executes relatively large vibrations, this cylindrical cavity thus forming the real coupling chamber or the only effective part of it, whilst the other part may be left out of account.

In the apparatus shewn in Figs. 11 to 14 the coupling chamber may of course be used similarly as in the previously described apparatus for transferring energy between the radiating member and the other parts of the apparatus, not only in receiving sound signals but also in sending sound signals; and connections may be made with detecting devices, etc., in the same manner as hereinbefore shown.

It is thus seen that the size of the coupling chamber need not be perfectly unchangeable, for in accordance with the invention provision may be made for altering its volume. In this way a convenient means of changing the degree of tightness of the coupling is produced and at the same time the scale of tunableness of the apparatus is made continuous. On account of the elastic properties of gases, an elastic power resides in the contents of the coupling chamber which adds to the elastic force of the adjoining oscillating members. The construction of an adjustable coupling chamber is a most simple matter, the coupling chamber being preferably made of two parts one of which slides in the other as in a telescope; or the end of the chamber that is farthest away from the radiating diaphragm being closed by an adjustable piston. This piston may in turn contain a diaphragm or some other form of vibratory member, or it may comprise a passage leading to a sound conducting tube.

In the cases of the apparatus described by reference to the Figs. 11 and 12 it was assumed that only the fundamental vibrations of the diaphragm were to be transmitted. But the movable piston in the coupling chamber may of course also be coupled with the radiating member in such a manner that the harmonics of the diaphragm, or its fundamental vibrations and harmonics standing in a certain relation to each other, are caused to effect the coupling chamber.

The above described geometrical separation of the coupling chamber from the radiating member is not the only means by which the damping effect caused by friction can be reduced, for the invention presents a second very simple means of accomplishing this, which consists in tuning the coupling chamber itself to the natural frequency of the radiating member or diaphragm. By attuning the diaphragm and the coupling chamber to each other a closer coupling than that which exists between an untuned diaphragm and chamber is obtained in any case, so that for a certain degree of coupling, the coupling chamber may be made larger, which means that the damping due to friction can be made smaller. But to obtain an effective acoustic coupling effect between the radiating member and the air chamber the size of the latter must still be very small. An evidence of this will be its peculiar shape, for even if the measures just described are adopted it will take the form of an extremely flat or shallow space extending across the surface of the radiating member. These attuned coupling chambers will also preferably be made conical, although other forms are possible. To facilitate the understanding of the cause of this difference in size in case of the coupling chamber being tuned or not tuned, it is necessary to imagine that in a tuned chamber much wider oscillations of the molecular particles of air are produced by the motion of the radiating diaphragm. These wider oscillations enhance the variations of pressure in the air filling of the chamber, especially in places near the yielding diaphragm or the opening arranged between the coupling chamber and the connected sound conducting parts or bodies.

The tuning of the air in the coupling chamber enables this latter to be made larger, so that it may for example in some cases be made ten times larger than before, without diminishing the closeness of coupling.

If the radiating member and coupling gas chamber are both attuned as described the sound signaling apparatus will have two maxima of responsiveness or frequencies of resonance corresponding to two different wave lengths and care must be taken that in sending out or receiving a certain tone, as in signaling, one of these wave lengths or frequencies corresponds to that of this tone, i. e. the signaling tone. If two different ones are to be sent out or received the two vibrating systems—radiating member and chamber—may be so tuned and the tightness of their coupling made such that the two favorable frequencies i. e. the frequencies of resonance at which the best effects are obtained, are those of the said tones. Under certain circumstances it will be advantageous for the reception of a certain tone or group of tones to make the tuning of the two vibrating systems, i. e. of the radiating member or diaphragm and of the gas chamber each coincide with the frequency employed. When two such systems, that are tuned to the same note or signaling frequency, are coupled to each other one frequency of resonance will always result that is higher and another that is lower than the signaling frequency used. They appear in the resonance curve in the form of crests between which there is a depression. The total damping and tightness of coupling then chosen will preferably be such that the signaling frequency lies in the depression, care being taken that this depression does not sink very far below the two crests in the resonance curve.

Apart from the fact that by tuning the gas coupling chamber (resonator) with respect to the diaphragm the coupling obtained between them is better in any case than if they were not tuned, the tightness of the coupling itself may here again be adjusted by the size and especially by the height of the chamber. The smaller, i. e. lower or shallower the resonant coupling chamber is made, the tighter its coupling with the diaphragm will be. By constructing the resonant chamber so that its size may be varied, the tightness of the coupling is rendered adjustable during the operation of the apparatus.

If the sound energy is to be conducted from or to the coupling chamber by means of a body of air, this can be conveniently done by connecting the chamber with the body of air through an opening or passage of a certain size. In doing this it must be borne in mind that for a given sound pitch each size of the resonant chamber requires a certain corresponding size of the said passage, and assuming the sound pitch to be constant the size of the passage or opening decreases as the volume of the chamber is diminished or as the resonant chamber is made lower or more shallow.

An apparatus of the type foreshadowed in the preceding eight paragraphs is illustrated in Fig. 15, which represents an apparatus with a coupling chamber attuned to the radiating diaphragm, the tuning feature being made evident by the relative size of the coupling chamber being shewn to differ from that of the coupling chambers that are not tuned. 1 again indicates the diaphragm that serves as a radiating member that closes the casing 2 that envelops the tunable coupling chamber or resonant chamber 4. This chamber is bounded at the opposite side by another diaphragm 37 in which there is an opening 22 that allows the sound waves to pass into the sound conducting tube 24.

Fig. 16 represents a resonance curve of an attuned apparatus of the kind shewn in Fig. 15, this curve representing the values obtained if the apparatus is made to act as a sound receiver and is excited by sound waves with a gradually increasing number of vibrations per second. The abscissas represents the frequencies of vibration of the sound that excites the apparatus and the ordinates show the corresponding loudnesses perceived. The frequency employed for signaling is $n$. The radiating member and the resonant coupling chamber are attuned to the frequency $n$ and the tightness of the coupling chosen is such that the depression $s$ between the two crests that represent the conditions for complete resonance does not sink very much below the crests.

By this means the range of frequencies within which a satisfactory loudness or responsiveness is obtained with the apparatus is considerably extended. By increasing the damping effect it is of course possible to extend this range at will at the cost of loudness. This would be done in cases where the sounds from a plurality of sound producers whose frequencies differ are to be received by one and the same receiving apparatus, or where trains of tones are to be received or sent out which contain different individual tones as in detecting noises or in telephoning.

In conducting sound energy by means of a body of air from or to the coupling chamber it might happen that the sound conductor produces a detrimental reaction upon the part of the sound signaling apparatus that comprises the diaphragm and coupling chamber inasmuch as it causes changes of the tuning and damping of this part. This disturbing reactive influence makes itself felt particularly when the coupling chamber is attuned to the diaphragm. Every change of the sound conducting pipe then gives rise to a variation in the conditions of tuning.

In accordance with the invention it is also possible to avoid this disadvantage and this is done by leaving a free space between the sound conducting pipe and the resonant coupling chamber.

If a plurality of sound transferring chambers are arranged one behind the other, say for example a separate resonator is placed behind the coupling chamber, then the free space must be interposed between those parts of the path along which the sound travels whose tuning is to remain constant and the parts of this path whose function is simply that of conducting the sounds.

Figure 17:
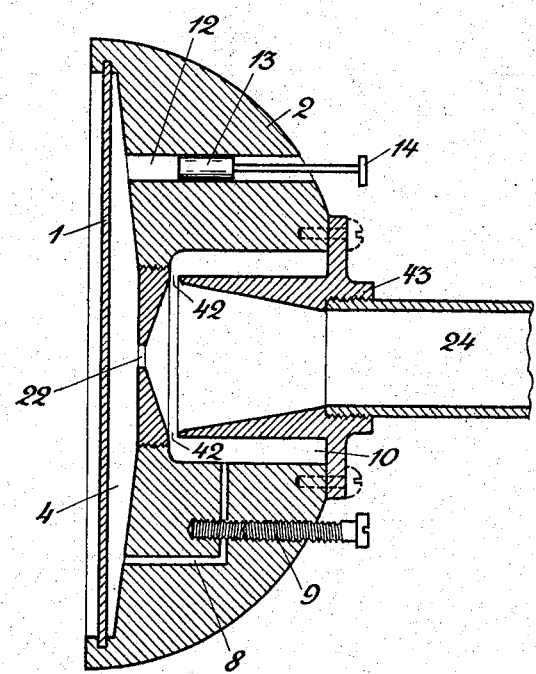
Fig. 17 illustrates a form of sound communication apparatus in which the sound conducting tube is spaced from the walls of the coupling chamber, and in which the coupling chamber is provided with the means for varying its volume and the normal pressure therein and with the gas throttle device.

In order to preserve the mechanical continuity of the apparatus the intermediate free space or break in the structure is bridged over and enclosed by a cover that is arranged at a considerable distance from the break and that also serves to prevent dirt etc. from penetrating into the interior of the apparatus. A form of apparatus having this feature is illustrated in Fig. 17. In this embodiment of the invention the coupling chamber 4 in the sound box 2, which latter is closed at one end by the diaphragm 1, is in communication through an opening 22 in the rear wall 37 with the sound conducting pipe 24. The pipe or tube 24 is provided with an extension member 43 forming a portion thereof which flares outwardly towards its end facing the opening or sound passage 22. This extension member 43 is provided with an annular shoulder or flange by means of which it is secured to the body or box 2, thus fixing the conduit 24 in proper relation to the passage 22. At 42 there is a free space or interspace between the rear exterior wall of the coupling chamber 4 and the sound conducting pipe 24, this interspace preventing as stated hereinbefore a reaction of the pipe 24 on the chamber 4 through the opening 22. The annular shoulder or flange on the extension member 43 serves to bridge over the free space or break 42 and seal the interior against outside influences.

The embodiment shown in this figure is provided with the means 12, 13 and 14 for altering the volume of coupling chamber 4 and also the normal pressure therein, as already described with reference to Figure 3; and also with the throttling arrangement 8, 9 and 10, as already described with reference to Figure 1.

The improved efficiency of sound boxes not provided with special detecting devices, resulting from the invention, enables them to be now used for practical purposes on board ship. They may be arranged in a known manner with their sound receiving or emitting diaphragm situated in a perforation of the ship's hull, or inside a tank or vessel (or on the wall of such a vessel) containing a liquid and arranged on the inner surface of the ship's skin. The latter arrangement has hitherto been impossible on account of the poor efficiency of the sound boxes in question and because of the loss of energy occurring in the passage of the sound through the ship's wall.

But if the apparatus is placed in an opening in the ship's wall or hull a difficulty in the fitting of the sound signaling apparatus into the ship will arise inasmuch as it will be necessary to rivet or weld the radiating member or diaphragm, i. e. at least one part of the apparatus, to the wall of the ship during its construction whilst it will generally not be possible to have the other parts of the apparatus also immediately installed by the ship builder. This gives rise to two great disadvantages: In the first place the operations such as welding or riveting necessary to fix the diaphragm in place are liable to seriously alter its tuning, and then it is difficult or impossible if, as is usually the case, the other parts are built in at a much later period and by a different supplier, to properly fit the parts together. To remove all these drawbacks is another of the objects of this invention and this is accomplished by dividing the sound signaling system into two fundamentally different parts, a pure ship-building part and the sound signaling apparatus proper, the former of which is put in during the construction of the ship in the ship building yard, whilst the latter is fixed in its totality to the former at any later time by the expert constructors of the sound signaling apparatus. According to the invention the former part is constructed in the form of a water inlet with a movable closing member or water gate and a device for mounting the sound signaling apparatus behind the gate. An ordinary slide valve and flange may be used for this purpose. The construction of the sound box is such that when the closing member is opened and the water enters into contact with its radiating member the latter closes up the opening in the hull.

In comparison with known devices of a similar character, which have all been built so as to enable the sound signaling apparatus to be protruded through the hull and to be drawn back through it, the distinguishing feature of the new device consists in the sound box being arranged in a fixed position and in the water gate not being used as an auxiliary member requiring frequent manipulation by an operator but merely as a means for enabling the sound signaling apparatus to be installed in strict compliance with the existing acoustic conditions.

Fig. 18 represents an arrangement in which a sound signaling apparatus constructed in accordance with the invention is inserted in an opening in the hull 38. The casing of the apparatus is provided with a flange 39 which abuts against the border of the said opening so as to form a watertight joint.

According to Figs. 19 and 20 the signaling apparatus is not placed immediately against the opening in the hull, but in order to enable it to be installed at any time it is combined with an independent water gate 51 that is equipped with a slide valve 52 and which has been previously fixed by the ship builder to the hull 38 by rivets or other means. The sound signaling apparatus is fixed by flanges 53, 54. In Fig. 19 the diaphragm is almost flush with the flanges, but according to Fig. 20 the arrangement is such that the diaphragm approaches as near as possible to the slide valve 52 so as to avoid losses and directive influences that might occur through the sound having to pass through the channel of the water gate. This arrangement may of course be used for all forms of sound boxes made in accordance with the invention, this being indicated by the insertion of different types of sound boxes in Figs. 19 and 20.

The apparatus shown in Fig. 21 is similar to that of Fig. 18, the only difference being that it is mounted on the rear wall 40 of a water tank arranged inside the hull instead of being attached to the inner surface of the hull itself.

In the case of Fig. 22 the sound signaling device projects into the interior of the water tank attached to the inside of the hull. For this reason the casing of the sound signaling apparatus is provided with a neck 41 to the rear end of which a flange 39 is joined that is riveted to the wall of the tank in the manner illustrated in Figs. 18 and 21. Sound signaling devices of this kind may be used for transmitting sound between different mediums as between water and air, and also between similar mediums, as from air to air. But they may also be used for converting electrical or mechanical energy into sound energy or vice versa, as by causing the diaphragm to be oscillated by an electromagnet instead of using it as as a receiving member actuated by the vibrations of a sound conducting medium.

In Fig. 23 an apparatus is shown in which most of the principal features of the invention are applied. Fixed to the interior of the hull 38 of a ship or buoy is a tank 40. Fitted into an opening in the back wall of the tank is a sound signal receiver that is fixed by means of flanges 39. The diaphragm 1 of receiver is provided with ribs 36 and abuts against the liquid charge in the tank. Arranged in liquid at the right of the diaphragm 1 is an air coupling chamber 17 in the shape of a very flat or shallow shell. This chamber is connected by air passages with the space 12, by which the gas pressure in the coupling chamber may be varied, and with the auxiliary chamber 30 into which the air is diverted from the coupling chamber when sounds of a low rate of vibration are received. The piston 13 is pushed into 12 by its handle 14 when the pressure in 17 is to be raised. The screw in 9 is for establishing or cutting off communication between the coupling chamber and the auxiliary chamber or for regulating the throttling effect of the passage through 8.

The space filled with liquid 15 and the air vessel 17 is closed at the right by a diaphragm 3 that is smaller than the diaphragm 1, so that 3 executes much larger vibrations than 1. The diaphragm 3 is attached to a vibratory structure 33 consisting of two masses connected by a longitudinally elastic rod, the right hand mass of which affects a second coupling chamber 4ª that is only made very small and which is in turn functionally connected through a diaphragm 37 and a small hole or passage 35 in 37 to an air chamber 23 which may be taken to represent the beginning of the actual sound conducting channel or pipe. The opening 35 is not present, i. e. is closed, in cases where the chamber 4ª is charged with a medium under pressure. Instead of using the diaphragm 37 the operative connection between the chambers 4ª and 23 could be obtained through a simple opening or passage of sufficient smallness. An increase of damping effect, which is necessary in cases where the region of resonance is excessively narrow, i. e. where the tuning is too sharp, may be obtained by means of perforated damping walls or grids 21 with staggered holes and by lateral damping walls 19. The clearance that is necessary between the right hand mass of vibratory structure 33 and the walls of the chamber 4ª to enable the mass to vibrate freely, is closed by an annular seal 32 made of a suitable yielding substance, so as to prevent the air from streaming to and fro between 4ª and 30, because this would preclude the production of sufficiently large amplitudes of pressure in 4ª. Adjoining the chamber 23 is a Helmholtz resonator 23ª tuned to the frequency of the signaling tone, and from the resonator a sound conducting tube 24 passes on to the operator's or listener's station.

Between the sound signaling apparatus itself—of which in this case the resonator forms a part—and the sound conductor 24 a small free interspace or gap 42 is interposed for the purpose of reducing the deleterious reaction of the sound conductor on the tuning of the resonator. To prevent foreign substances from getting into the gap this latter is protected by a guard 41.

The apparatus operates as follows: The sound waves arriving from without impinge against the hull 38 and are passed on by the water in the tank 40 to the diaphragm 1 which is caused to execute vibrations whose amplitude is approximately that of the vibrating molecules of water. On account of the smallness of the chamber 17 the fluctuations of the pressure of its contents are very large and these are passed on by the surrounding liquid 15 to 3 and thence to 33. The diaphragm 3 executes larger amplitudes of motion than 1 but in order to still further enhance these amplitudes the second small air chamber 4ª is provided. In the opening or passage 35 the air executes oscillations of larger amplitude than in any other part of the apparatus and these oscillations set the column of air in the resonator in motion, and this motion is propagated in the sound conductor 24. The distribution of the masses in 33 may be such (right hand mass smaller than the left) that this structure 33 also assists in increasing the amplitudes of the oscillations as they pass on toward 4ª.

By tuning the individual diaphragms, the air chambers, and the vibratory structure with respect to each other and to the signaling frequency a very considerable further improvement of the receiving properties of the apparatus in regard to loudness and reduction of disturbing effects can be obtained, as has already been hereinbefore specifically explained.

To meet the practical requirements on board ship a plurality of sound signaling devices is needed of which for certain purposes, such as finding the direction of a sound, one at least must be arranged on the starboard and one on the port side of the vessel. In using these apparatus as receivers means must be provided by which an operator stationed at a certain place may listen to each of them alternately and compare the loudness of the sounds arriving at each for the purpose of determining their direction. According to the invention this is rendered possible by connecting the sound boxes (arranged in openings in the hull or in tanks attached to the hull, or within these tanks) by pipes to the operator's station and interposing a mechanical switching device between the pipes and the station.

An installation of this kind is illustrated in Fig. 24 which represents the bow of a ship with two sound boxes 2 arranged in two water tanks 40 placed directly abeam on the inner surfaces of the ship's sides 38. Sound conducting pipes 24 lead from the coupling chamber 4 to a switching device consisting of a base-plate 46 with two holes 45 and a movable plate 48 with an aperture 49 leading to a hearing tube 50. By means of a handle 47 the aperture 49 may be made to register with either of the pipes 45 so as to connect the hearing tube 50 to either of the two sound boxes alternately.

The same arrangement may be employed in systems in which sound boxes as shewn in Figs. 18, 19, 20 and 21 are used and it will be obvious that it may be readily adapted to cases in which more than two sound signaling apparatus are provided.

In the following claims the term "sound conducting device" will be used to describe any means for causing sound that arrives at any point to be passed on, conveyed to, or made audible at, another point. Hence this term is meant to also include hearing or speaking tubes, and electrical devices or conductors through which speech is transmitted by the medium of electric currents. The term "vibratory body" is intended as a generic term, including for example not only diaphragms but also bodies or columns of gas which are capable of taking up vibrations.

We claim:

1. In sound communication apparatus, a vibratory member, and a chamber containing gas so related to the vibratory member that the normal vibrations of the latter effect substantial changes of volume in the chamber, the vibratory member and the chamber being individually tuned to the same frequency.

2. In submarine sound communication apparatus, a radiating member, a sound conducting device, and a shallow gas-containing coupling chamber of such size and shape with relation to the radiating member as to cause during operation pressure variations within the contained gas substantially balancing those produced by the sound in the propagating medium in contact with the radiating member.

3. In submarine sound communication apparatus, a radiating member, a sound conducting device, and a shallow coupling chamber of small volume bounded by the said radiating member and having gaseous contents whose quantity per unit of space during the vibration of the radiating member is developed to produce a close coupling between the radiating member and the sound conducting device.

4. In submarine sound communication apparatus, a radiating member, a sound conducting device, and a shallow coupling chamber of small volume bounded by the said radiating member and with gaseous contents under a pressure during the vibration of the radiating member adapted to produce a close coupling between the radiating member and the sound conducting device.

5. In subaqueous sound signaling apparatus, in combination, a plurality of vibratory bodies, a coupling chamber therebetween containing a gas adapted to have pressure developed in it sufficient to create an effective acoustic coupling between the vibratory bodies, and means for regulating the pressure developed in the gas, to secure a close or loose coupling.

6. In subaqueous sound signaling apparatus, in combination, a plurality of vibratory bodies, a coupling chamber therebetween containing a gas adapted to have pressure developed in it sufficient to create an effective acoustic coupling between the vibratory bodies, and means for automatically lowering the pressure developed in the gas, at certain undesired frequencies.

7. In subaqueous sound signaling apparatus, in combination, a vibratory diaphragm exposed to the sound propagating medium, a second vibratory body to be coupled therewith, and a coupling chamber between said vibratory diaphragm and said second vibratory body, said coupling chamber containing gas and having a volume sufficiently small with respect to the vibratory area acting on the gas as to enable the vibratory area to develop within the gas a pressure substantially equal to that created in the water at the outer face of said vibratory diaphragm.

8. In sound communication apparatus, a sound radiating member, a sound conductor, and a coupling gas chamber adapted to closely couple the radiating member with the sound conductor and having a gap between it and the sound conductor.

9. In sound communication apparatus, a sound radiating member, a sound conductor, a coupling gas chamber adapted to closely couple the radiating member with the sound conductor and having a gap between it and the sound conductor, and a guard enveloping the said gap.

10. In sound communication apparatus, a vibratory member, a sound conductor, and a coupling chamber between the vibratory member and the sound conductor for closely coupling said member and said conductor together; said coupling chamber having a passage leading therefrom to the sound conductor which passage has a cross sectional area smaller than the active area of the vibratory member.

11. In sound communication apparatus, a vibratory member, a sound conductor, and a coupling chamber between the vibratory member and the sound conductor for closely coupling said member and said conductor together; said coupling chamber having a passage leading therefrom to the sound conductor which passage has a cross sectional area smaller than the active area of the vibratory member and smaller than the cross sectional area of the sound conductor.

12. In sound communication apparatus, a sound radiating member, a sound conducting device, and a coupling chamber with gaseous contents having low internal friction whose quantity per unit of space during the vibrations of the radiating member is developed to produce a close coupling between the radiating member and the sound conducting device.

13. In sound communication apparatus, a sound radiating member, a sound conducting device, a coupling chamber with gaseous contents whose quantity per unit of space during the vibrations of the radiating member is developed to produce a close coupling between the radiating member and the sound conducting device, and an auxiliary gas chamber in communication with the coupling chamber through a duct adapted to exert a throttling effect on the gas oscillating in it at certain frequencies.

14. In sound communication apparatus, a sound radiating member, a sound conducting device, a coupling chamber with gaseous contents whose quantity per unit of space during the vibrations of the radiating member is developed to produce a close coupling between the radiating member and the sound conducting device, an auxiliary gas chamber in communication with the coupling chamber through a duct adapted to exert a throttling effect on the gas oscillating in it at certain frequencies, and means for regulating the said throttling effect.

15. In sound communication apparatus, a sound radiating member, a sound conducting device, a coupling chamber with gaseous contents whose quantity per unit of space during the vibrations of the radiating member is developed to produce a close coupling between the radiating member and the sound conducting device, an auxiliary gas chamber in communication with the coupling chamber through a duct adapted to exert a throttling effect on the gas oscillating in it at certain frequencies, and means for regulating the said throttling effect whereby the coupling effect of the coupling chamber is made loose for frequencies below the desired frequencies so that the audibility of the lower frequencies is diminished.

16. In sound communication apparatus, a radiating member, a sound conducting device, a coupling chamber with gaseous contents whose quantity per unit of space during the vibrations of the radiating member is developed to produce a close coupling between the radiating member and the sound conducting device, and means for varying the coupling power of the coupling chamber.

17. In sound communication apparatus, a radiating member, a sound conducting device, a coupling chamber with gaseous contents whose quantity per unit of space during the vibrations of the radiating member is developed to produce a close coupling between the radiating member and the sound conducting device, and means for varying the size of the coupling chamber.

18. In sound communication apparatus, a radiating member, a sound conducting device, a coupling chamber with gaseous contents whose quantity per unit of space during the vibrations of the radiating member is developed to produce a close coupling between the radiating member and the sound conducting device, and means for varying the magnitude of the gas pressure developed in the coupling chamber.

19. In sound communication apparatus, a vibratory member, a sound conducting device, and a coupling gas chamber adapted to closely couple the vibratory member with the sound conducting device, the vibratory member and the coupling chamber being individually tuned to the same frequency.

20. In sound communication apparatus, a radiating member, a sound conducting device, and a coupling gas chamber of such a size and shape with relation to said vibratory member as to be adapted to cause pressure variations in the contained gas during the actuation of the vibratory member substantially equivalent to those produced by the sound waves in the medium before the radiating member, the radiating member and the coupling chamber being individually tuned to the same frequency.

21. In sound communication apparatus, a vibratory member, a sound conducting device, and a coupling chamber with gaseous contents whose quantity per unit of space during the vibration of the vibratory member is developed to produce a close coupling between the vibratory member and the sound conducting device, the vibratory member and the coupling chamber being individually tuned to the same frequency.

22. In sound communication apparatus, a vibratory member, a sound conducting device, and a coupling gas chamber adapted to closely couple the vibratory member with the sound conducting device; the vibratory member and the coupling chamber being individually tuned to the same frequency and associated with each other so as to form a vibratory system having two pronounced frequencies of resonance, forming part of a band of resonance frequencies which includes the frequencies of the sound to be communicated.

23. In sound communication apparatus, a vibratory member, a sound conducting device, and a coupling chamber with gaseous contents whose quantity per unit of space during the vibration of the vibratory member is developed to produce a close coupling between the vibratory member and the sound conducting device; the vibratory member and the coupling chamber being individually tuned to the same frequency and associated with each other so as to form a vibratory system having two pronounced frequencies of resonance forming part of a band of resonance frequencies which includes the frequencies of the sound to be communicated.

24. In sound communication apparatus, a vibratory member, a sound conducting device, and a coupling gas chamber adapted to closely couple the vibratory member with the sound conducting device, the vibratory member and the coupling chamber being tuned and associated with each other in such manner as to form a vibratory system having a band of frequencies of resonance including the frequencies of the sounds to be communicated.

25. In sound communication apparatus, a vibratory member, a sound conducting device, and a coupling chamber with gaseous contents whose quantity per unit of space during the vibration of the vibratory member is developed to produce a close coupling between the vibratory member and the sound conducting device, the vibratory member and the coupling chamber being tuned and associated with each other in such manner as to form a vibratory system having a band of frequencies of resonance including the frequencies of the sounds to be communicated.

26. In sound communication apparatus, a vibratory member, a sound conducting device, and a coupling gas chamber adapted to closely couple the vibratory member with the sound conducting device, the vibratory member and the coupling chamber having individual natural rates of vibration that coincide with that of the sound used for communication.

27. In sound communication apparatus, a vibratory member, a sound conducting device, and a coupling chamber with gaseous contents whose quantity per unit of space during the vibration of the vibratory member is developed to produce a close coupling between the vibratory member and the sound conducting device, the vibratory member and the coupling chamber having individual natural rates of vibration that coincide with that of the sound used for communication.

28. In sound communication apparatus, a vibratory member, a sound conducting device, and a coupling gas chamber adapted to closely couple the vibratory member with the sound conducting device; the vibratory member and the coupling chamber being individually tuned to the same sound and forming a vibratory system having two pronounced frequencies of resonance, and the damping of said system and the coupling effect of the coupling chamber being such that the amplitude of vibration of said system at frequencies lying between the two resonance frequencies caused by the coupling between the two said vibratory structures does not sink appreciably below the amplitude of vibration of the said two coupling resonance frequencies.

29. In subaqueous sound communication apparatus, a plurality of vibratory bodies, a gas-containing coupling chamber interposed between said bodies and so related to one as to develop variations in pressure in the gas by the vibration of said body which variations are substantially as great as those caused by the sound in the sound propagating medium.

30. In subaqueous sound communication apparatus, a plurality of vibratory bodies, a chamber containing gas for coupling said bodies together by gas pressure, and means for relieving said pressure at certain frequencies of vibration.

31. In subaqueous sound communication apparatus, a plurality of vibratory bodies, a chamber containing gas for coupling said bodies together by gas pressure, and means for varying the volume of said chamber to vary the pressure to be developed.

32. In subaqueous sound communication apparatus, a plurality of vibratory bodies, a chamber containing gas for coupling said bodies together by gas pressure, means for varying the volume of said chamber to vary the pressure normally to be developed, and means for relieving said pressure at certain frequencies of vibration.

In testimony whereof we affix our signatures.

HEINRICH HECHT.
HUGO LICHTE.
WILHELM RUDOLPH.
WALTER HAHNEMANN.